Sept. 20, 1949.   L. G. DUGGAR   2,482,105
NAVIGATIONAL SYSTEM
Filed March 5, 1945   3 Sheets-Sheet 3

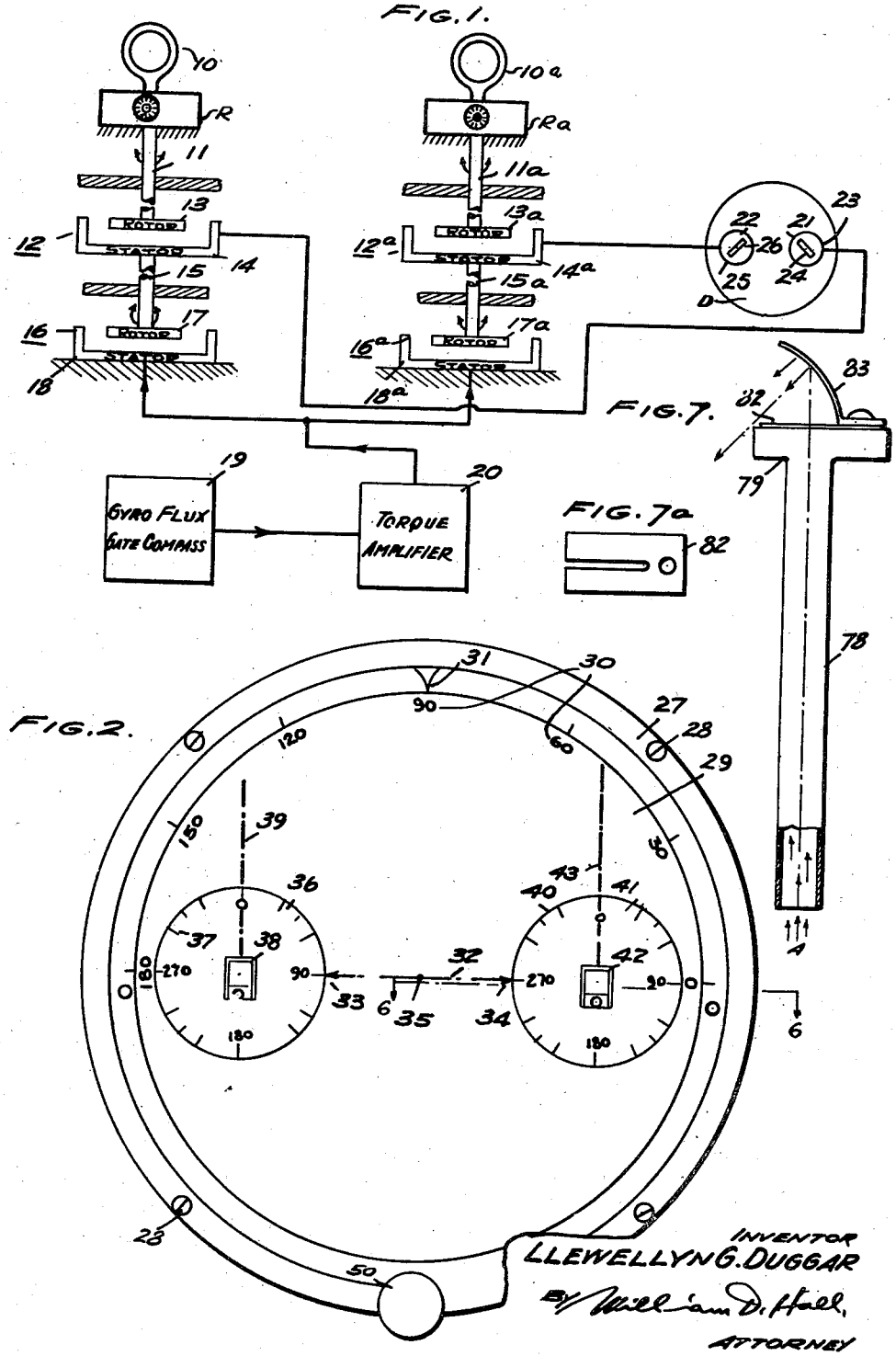

INVENTOR
LLEWELLYN G. DUGGAR
BY William D. Hall
ATTORNEY

Patented Sept. 20, 1949

2,482,105

UNITED STATES PATENT OFFICE 2,482,105

NAVIGATIONAL SYSTEM

Llewellyn Goode Duggar, United States Army, Montgomery, Ala.

Application March 5, 1945, Serial No. 581,012

9 Claims. (Cl. 343—112)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to navigational systems and more particularly to visual navigational aids in which an indication in terms of true azimuth is continuously provided of the position of a craft with respect to two or more sources of radio energy. A divisional application relating to the apparatus has been filed, Serial No. 86,831, April 11, 1949.

Heretofore, navigational instruments of this general type have been found wanting because they did not automatically give the true azimuth bearing of the craft or vehicle with respect to the radio beams utilized. The use of two separate radio compass systems to obtain a "fix" is well known in the art. The prior art devices, however, will not automatically give the true azimuth bearing of the craft with respect to each radio beam tuned in by the separate radio compasses. Prior art devices have been heavy and bulky with the result that they have not achieved acceptance in the aircraft field.

By the term "craft" as used herein, I intend to include any type of vehicle or vessel that is movable over the ground, in the air, and on or under the water.

In this specification the term "Selsyn" refers to a servo element or system generally referred to as "synchro," which has become a generic term relating to servo or motion reproducing devices used for transmission of angular position of some rotatable member to another remotely located rotating member. These devices and systems are known by various trade names or trade-marks, as Autosyn, Magnesyn, Syncrotie, Diehlsyn, Siemens. Theoretically, a synchro device or Selsyn is treated as a salient-pole bipolar alternating current excited synchronous machine. A typical form is a two-pole single-phase rotor field and a Y-wound single phase variable voltage stator. The transmitter of a synchro or Selsyn whose rotor is geared to or otherwise linked with mechanical equipment, is also called a generator, Selsyn generator, or synchro generator. The indicator, also called a motor, synchro-motor or Selsyn motor or motor Selsyn, has a motor that is free to rotate and is damped to prevent excessive oscillation before coming into correspondence with the rotor of a transmitter. These devices are also known as synchronous units, or self-synchronous units. Since the device known by the trade-mark name of "Selsyn" was used in the embodiment of the invention, that name has been applied to the elements so involved in the invention.

It is an object of my invention to provide a visual navigational instrument which will at all times keep a pilot oriented as to his position with relation to a given area, the accuracy and range of such orientation being determined by the exactness of the radio beacon bearings.

It is another object of my invention to provide a visual aid instrument which will provide a baseline between the pivot points of two radio compass indicators, and which may be set to the same azimuth as the ground line connecting the two radio beacons.

It is another object of my invention to provide a visual navigational instrument of the type utilizing radio compass bearings from two radio stations in which such instrument will be sufficiently light, compact, and accurate to be utilized on the instrument board of an aircraft.

These and other objects and advantages will be readily apparent when the following specification is read in connection with the accompanying drawings in which:

Fig. 1 is a diagrammatic layout of my invention.

Fig. 2 is a front view of the indicating portion of my invention showing the normal position of the indicator when the device is not in action.

Fig. 7 is a detailed view partly in section of the Selsyn indicator light transmitting means.

Fig. 7a is a plan of the slotted screen in the light transmitting means of Fig. 7.

Figure 3:
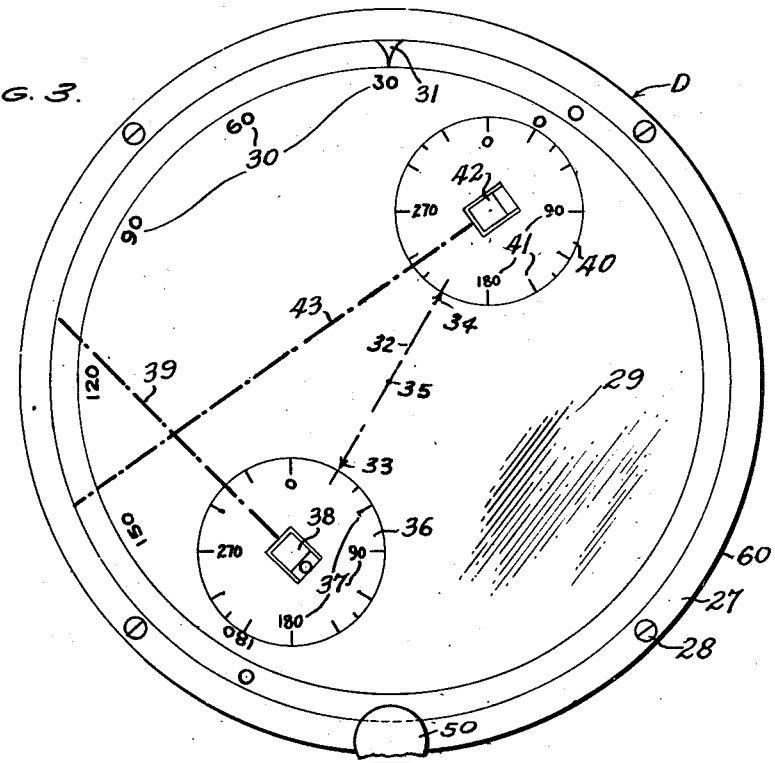
Fig. 3 is a view of the indicating instrument illustrated in Fig. 2 showing the position of the indicator when the craft is on an azimuth bearing of 315° from one radio station and 230° from the other radio station, the azimuth bearing of the axis line between the two radio stations being 30°.

Referring to Fig. 1, which illustrates a diagrammatic layout of my invention, it is seen that the reference numerals 10 and 10a refer to radio direction finder loop antennas of the type which are normally automatically rotated but may be hand rotated to various positions of azimuth.

The loop antennas 10 and 10a are each utilized with a radio receiver R and Ra respectively whereby a bearing may be taken on one or more radio transmitters in a manner well known in the art. Since the particular structure of the antenna and of the radio receiver portion of the radio direction finder forms no novel part of my invention, no detailed description thereof is given.

A pair of generator or transmitter Selsyns 12 and 12a, each having a rotor 13, 13a and a stator 14, 14a respectively, are so positioned with respect to each rotating loop antenna 10 and 10a that the loop antenna 10 is connected by a drive 11 (in this case, a rotating mast or shaft) with the rotor 13 of the generator or transmitting Selsyn 12, and the loop antenna 10a is similarly connected by shaft of a drive 11a to the rotor 13a of the Selsyn 12a. Thus the rotation of the loop antenna 10 will cause the generator Selsyn rotor 13 to assume the identical angular position for azimuth. In a similar manner the Selsyn rotor 13a will have the same angular position of azimuth as the loop antenna 10a.

The drives 11 and 11a may be direct mechanical drives, or, an electrical translating device such as a Selsyn may be utilized to transfer the rotational movement of the loop antenna to the rotor 13 or 13a of the transmitting Selsyn.

The stator 14 of the transmitting Selsyn 12 is not fixed but is mounted for rotation in either direction about an axis identical with that of the rotor 13.

In line with the generator Selsyn 12 there is positioned a large heavy-duty motor Selsyn 16, having a rotor 17 and a fixed stator 18. The stator 14 of the generator Selsyn 12 is connected by means of a drive 15 to the rotor 17 of the fixed heavy-duty motor Selsyn 16. The stator 18 of the heavy-duty motor Selsyn 16 remains fixed relative to its support, and the latter is rigidly fixed with the body of the craft. In a like manner the stator 14a of the generator Selsyn 12a is connected by means of a drive 15a to rotor 17a of a large heavy-duty motor Selsyn 16a, having a fixed stator 18a. Here again the drives 15 and 15a may be direct mechanical drives, or, electrical translating devices such as Selsyns may be utilized to transfer the rotational movement of the rotors 17 and 17a to the stators 14 and 14a respectively.

The field windings of the stator 18 and of the stator 18a are acted upon by the electrical output of a gyro flux gate compass 19 which is amplified in a torque amplifier 20 and fed commonly into the windings of each stator 18 and 18a. The gyro flux gate compass 19 and the torque amplifier 20 are of the type well known in the art in which the direction or heading of a craft is compared with a true north bearing or azimuth.

A compact visual dial instrument D, Fig. 1, having two indicating Selsyns 21 and 22, which will be described in more detail later, is situated in such a position in the craft as to be freely visible and accessible to the pilot or operator of a craft. The indicating Selsyns 21 and 22 are of the conventional type each having a stator 23, 25 and a rotor 24 and 26, respectively. The stator 14 of the generator Selsyn 12 is connected in the usual manner to the stator 23 of the indicating Selsyn 21. Similarly, the stator 14a of the generator Selsyn 12a is connected to the stator 25 of the indicating Selsyn 22. Thus, the rotor 24 will assume the same bearing or azimuth of the generator Selsyn rotor 13, and loop 10, and the rotor 26 will independently assume the azimuth position of the rotor 13a and loop 10a.

By means of the construction related in the foregoing paragraphs, it is seen that the windings of the generator Selsyn stators 14 and 14a are affected not only electrically by the position of the rotors 13 and 13a and their antenna loops, but are also affected positionally by changes in azimuth of the Selsyn rotors 17 and 17a respectively. Thus the voltages fed into the stators 23 and 25 of the indicating Selsyns 21 and 22 are indicative not only of the positions of the rotors 13 and 13a respectively but also are indicative of the angular positions of the generator Selsyn stators 14 and 14a respectively, the generator stators 14 and 14a being in turn dependent for their angular position upon the position of the rotors 17 and 17a respectively of the heavy-duty motor Selsyns 16 and 16a.

Referring to Figure 2, which is a front view of the visual indicating portion of my invention (corresponding to the dial instrument D schematically shown in Fig. 1) which may be so situated or positioned in a craft that it is capable of easy visual access by the pilot or operator thereof, it is seen that the reference numeral 27 refers to a bezel plate which may be mounted upon a dash or instrument board by means of screws 28. A large circular dial 29 having azimuth indicia 30 is so mounted as to permit rotation thereof to various angular positions. A pointer 31 upon the bezel 27 serves to give the angular position of the dial 29 as it is rotated to various positions. In the center of the large dial 29 a slender marker line 32 having arrows 33 and 34 is formed through its pivot axis 35 which will further indicate the azimuth of a baseline connecting the two radio stations utilized for obtaining a "fix" as will be disclosed more fully later.

To the left of the dial pivot axis 35 in Fig. 2 there is situated a Selsyn azimuth indicating card 36 having azimuth markings 37 thereon. A reflected light source 38 which is rotated to various angular positions by an indicator Selsyn as, 22, in Fig. 1 (not shown in Fig. 2), produces a beam of light 39. Similarly, to the right of the dial pivot axis 35 there is placed a Selsyn azimuth indicator card 40 having azimuth markings 41 thereon. A reflected light source 42 which may be rotated to various angular positions by an indicator Selsyn as at 21 in Fig. 1 (not shown in Fig. 2), produces a beam of light 43.

Figure 5:
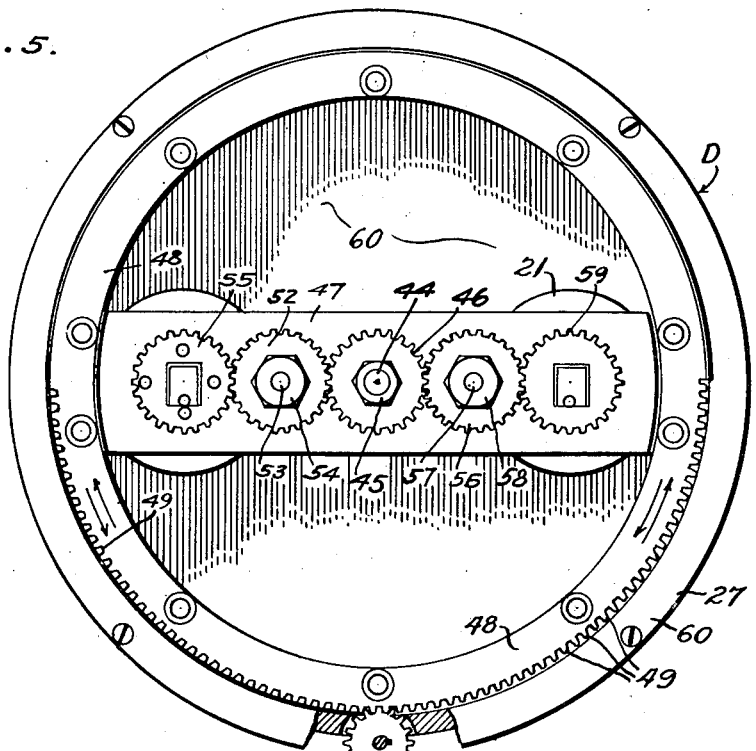
Fig. 5 is a view of the indicating instrument illustrated in Fig. 2 with the cover removed.

Referring to Fig. 5 which is a front view of the indicator portion of my invention with the dial 29 removed, it is seen that the reference numeral 44 refers to a center spindle fixed with the bezel 27, having mounted thereon a fixed gear 46 held in position by a spindle nut 45. A support member 47 in the form of a cross beam diametrically arranged behind the dial 29 carries bolted thereto at 86 a cylindrical ring gear 48 coextensive with the dial having external gear teeth 49 cut along the lower 190° of its perimeter. The support member 47 has a hub revoluble upon the fixed spindle 44, to permit rotation of the cylindrical ring 48 about the fixed spindle 44. Rotation of the gear ring 48 is accomplished by means of a small gear 51 mounted upon a handknob 50.

To the left of the fixed gear 46 and meshing therewith is mounted an idler gear 52 mounted upon a shaft 53 by means of a spindle nut 54. The idler gear 52 is mounted for rotation about the shaft 53. To the left of the idler gear 52 and meshing therewith is a driven gear 55 having the same diameter as the fixed gear 46.

Similarly, to the right of the fixed gear 46 and meshing therewith is an idler gear 56 rotatably mounted upon a spindle bolt 57 and held thereto by the bolt head 58. To the right of the idler gear 56 and meshing therewith is a driven gear 59 having the same diameter as the fixed gear 46.

Rotation of the knob 50 rotates gear 48 about the fixed spindle 44, and due to the two idler gears 52 and 56 meshing with the fixed gear 46, the two driven gears 55 and 59 are thereby oppositely rotated through an angle equal to that of the angular rotation of the ring gear 48. The large dial 29 (Fig. 2) is fixed upon the latter so that rotation of the ring gear 48 rotates the dial 29 equally. The Selsyn indicator card 36 is mounted upon the driven gear 55 so as to rotate directly therewith. In a similar fashion the Selsyn indicator card 40 is mounted directly upon the driven gear 59 so as to rotate directly therewith.

Figure 6:
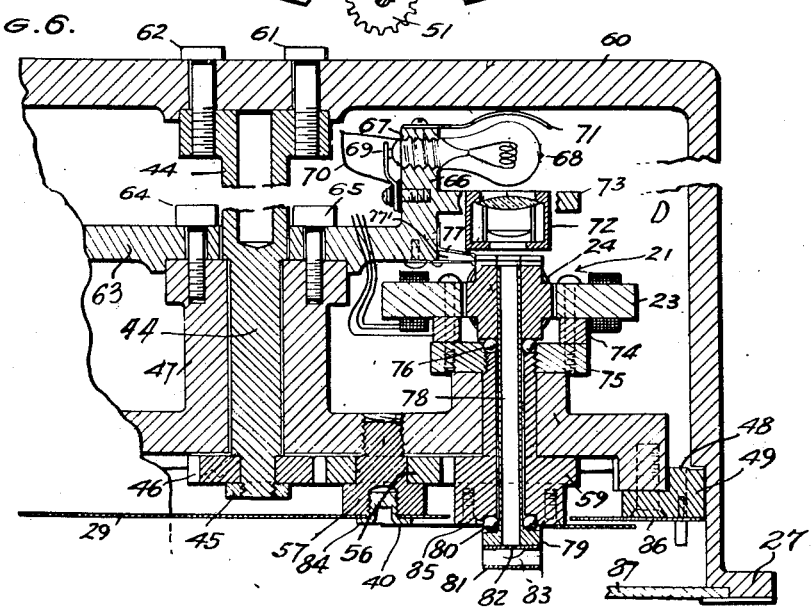
Fig. 6 is a fragmentary cross-sectional view along the line 6—6 of Figure 2.

Referring to Fig. 6, it is seen that the reference numeral 60 refers to a casing in which the instrument is housed. The indicating instrument may be mounted in any suitable manner, as for example, upon the instrument board of a craft or vehicle. Extending forwardly from the rear of the casing is a center shaft or fixed spindle 44 fastened thereto by bolts 61 and 62. Rotatably mounted and surrounding the fixed spindle 44 is the cross member support 47 upon which is secured a rotating arm bracket 63 held on to the hub by bolts 64 and 65. A right angle extension 66 of the bracket 63 contains an integral light bulb socket 67 in which is placed a small light bulb 68. An insulated spring contact member 69 serves to engage the center contact of the light bulb while the circuit is completed conventionally through the bracket, current being delivered through a cable 70. A concave reflector 71 reflects the light downwardly from the bulb through a set of condensing and collimating lenses 72, which are mounted upon an arm 73 of the bracket 63.

The stator 23 of indicator Selsyn 21 is mounted upon base blocks 74—75, attached to an elongated tubular hub of the gear 59 so that the latter may rotate the stator, and this hub serves as a bushing in the support 47 for the light tube 78 to be described. Ball bearings 76 are provided between the rotor 24 and hub of gear 59. Electrical connections are made to the indicator Selsyn rotor 24 by means of brushes 77 and 77' which are mounted upon the rotating arm bracket 63, one of which at least should be insulated. The leads to these brushes may be conventional and are not shown.

Passing through the center of the indicator Selsyn rotor and stator and securely attached to the rotor 24 there is a light conducting tube 78 the extreme lower end of which is broadened out to a shoulder 79 which rides upon the lower ball bearings 80. Mounted on the same end of the tube as the shoulder 79 and at right angles to the tube 78 there is a housing 81 having a slotted screen 82 communicating with the interior of the tube 78. A reflector 83 mounted within the tubular housing 81 serves to direct a narrow beam of light at right angles to the beam of light passing downwardly through the tube 78 and narrowed by the slotted screen 82. See Figures 7 and 7a. Since the tube 78 is fastened to the indicator Selsyn rotor 24 and rotates therewith, it is seen that rotation of the indicator Selsyn rotor 24 will cause the beam of light which is reflected from within the tubular housing 81 to be angularly rotated an amount equal to the angular rotation of the indicator Selsyn rotor 24. The direction of the light beam issuing from the light director tube 78 may be changed by means other than that illustrated; for example, the reflector 83 may be replaced by a prism or by a mirror arrangement.

The dial 29 is mounted by means of a cover stud 84 screwed therethrough into the idler gear pivot 57 on the cross member 47.

The dial 29 is formed with circular openings concentric with the axes of the gears 55 and 59, to receive hubs of these gears therethrough. The hubs have end faces set just beyond the face of the dial, and the cards 36 and 40 are secured to the end faces of the hubs by screws as at 85 in Fig. 6, so that the cards lie in close parallel relation to the dial. The structure of the Selsyn indicating mechanism 22 is identical with that of the Selsyn indicator mechanism 21 as illustrated in Figure 6. The face of the entire indicating instrument is protected by a cover glass 87.

Each tube 78 and reflector 83 being fixed with the rotor of the adjacent Selsyn, the light beam thus assumes an angular position over the dial which corresponds to the induced angular position of the stator thereby the combined radio beam input from 10 or 10a and from the gyro flux gate compass plus or minus the movement put in by knob 50 manually. The latter may be clockwise or counterclockwise, according to the instant angular position of the craft's longitudinal axis in relation to lines of longitude on the earth, and so the base line 32 will vary from its initial normal relation to the radius of pointer 31 shown in Fig. 2 by the value of input from knob 50. Without rotation of the knob, the combined input from the antenna 10 or 10a and gyro flux compass tends to introduce an error into the angular position of the beams 39 and 43 equal to the angular value of the input from the gyro flux compass. But the operation of the knob 50 to position the ring gear in relation to pointer 31 according to the true north angle derived either from a compass indicator, or as above stated by computation from the known positions of the two ground stations in relation to true north, has the effect of subtracting angular movement error produced by the induction values derived from Selsyns 16 and 16a in the electrical input to the Selsyns 22 or 21. This leaves the positional values of the antennas direction products which then become displayed by positioning of the beams 39 and 43 mutually and in relations to the base line 32 in the same relations which the actual radio beams have to each other and in relation to a line between the two land stations. If a map is laid over or formed at the dial 29 on a scale which brings the points on the map representing the stations on the axes of the cards 36 and 40, the light beams 39 and 43 then have the same positions on the map which the radio beams from the land stations have in relation to the earth. The intersection of the beams 39 and 43 gives a "fix" representing the location of a point on the map or in relation to the line 32 which corresponds to the position of the craft over the earth.

A modification of the indicating instrument just described may be had by providing a transparent map overlying the cover glass 87 so that the pilot of a craft may actually mark his course on the map and so guide the craft that the intersection of the two light beams falls upon the marked course. Instead of providing a transparent map overlay, the image of a map may be projected upon the cover glass. By proper spacing of the projector, the scale of the map may be varied. A still further modification may be had in the provision of a fluorescent coating upon the inside of the cover glass 87 which will be excited by ultra violet light emitted instead of the visible light source described.

To use the device, the radio antennae direction finders 10 and 10A are each rotated in the conventional manner so as to train them upon two known radio stations or beacons. The thumb screw 50 on the visual position indicator is then turned so that an indicated azimuth between the two light beam indicators 38 and 42 corresponds to that of the true north azimuth known to exist between the two ground radio stations or beacons being utilized. In this manner a similar triangle is established on the face of the indicating instrument which may be compared to the triangle drawn on a map showing the location of the two radio stations or beacons being used. The point of intersection of the two light beams 39 and 43 will show the position of the craft at all times. Furthermore, the scale of the instrument depends upon the proportion of the distance between the axes of the Selsyn indicators to the distance between the two radio stations or beacons.

Figure 3 illustrates the appearance of the dial of the indicating instrument when the base line connecting the two radio stations or beacons has an azimuth bearing of 30° and where the craft is on an azimuth bearing of 315° from one radio station or beacon and on an azimuth bearing of 230° from the other radio station or beacon. The intersection of the two light beams indicates the position of the craft with respect to the two radio stations or beams.

Figure 4:
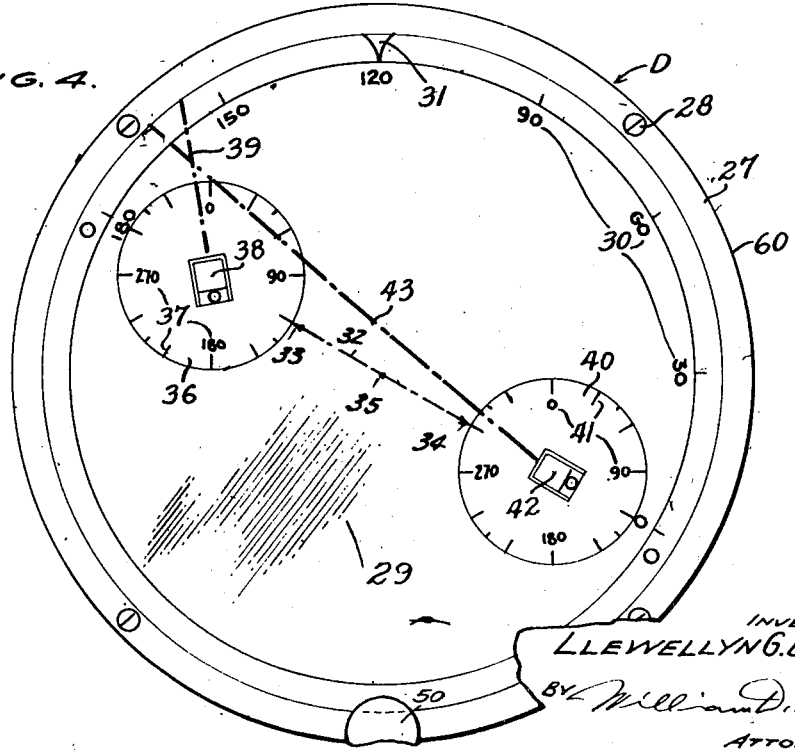
Fig. 4 is a view of the indicating instrument illustrated in Fig. 2 in which the indicator beams show a position of 120° azimuth for the axis line between the two radio stations with the craft on an azimuth of 350° with one station and 310° from the other station.

Figure 4 illustrates the appearance of the indicating instruments when the base line between the two radio stations or beacons has an azimuth bearing of 120° and where the craft lies on an azimuth of 350° from one of the radio stations and on an azimuth of 310° from the other of the radio stations.

Although I have illustrated one embodiment of my invention, it is obvious that many changes may be made without departing from the invention as defined by the appended claims.

I claim:

1. In a navigational aid device of the type having at least two radio receivers, each utilizing a rotatable loop antenna, a transmitting Selsyn having a rotor and a stator, means for causing said transmitting Selsyn rotor to duplicate the angular position of one of said rotatable loop antennas, a motor Selsyn having a rotor and a stator, means for causing said transmitting Selsyn stator to duplicate the angular position of said motor Selsyn rotor, an indicating Selsyn having a stator and a rotor, means for electrically connecting the stator of said transmitting Selsyn to the stator of said indicating Selsyn, a north indicating compass and means for changing the electrical field of said motor Selsyn stator in accordance with the indication of said north indicating compass.

2. In a navigational aid device of the type having at least two radio receivers, each utilizing a rotatable loop antenna, a transmitting Selsyn having a rotor and a stator, means for causing said transmitting Selsyn rotor to duplicate the angular position of one of said rotatable loop antennas, a motor Selsyn having a rotor and a stator, means for causing said transmitting Selsyn stator to duplicate the angular position of said motor Selsyn rotor, an indicating Selsyn having a stator and a rotor, means for electrically connecting the stator of said transmitting Selsyn to the stator of said indicating Selsyn, a gyro flux gate compass, and means causing the output of said gyro flux gate compass to change the electrical field of said motor Selsyn stator in accordance with the indication of said gyro flux gate compass.

3. In a navigational aid device of the type having at least two radio receivers, each utilizing a rotatable loop antenna, a transmitting Selsyn having a rotor and a stator, means for causing said transmitting Selsyn rotor to duplicate the angular position of one of said rotatable loop antennas, a motor Selsyn having a rotor and a stator, means for causing said transmitting Selsyn stator to duplicate the angular position of said motor Selsyn rotor, an indicating Selsyn having a stator and a rotor, means for electrically connecting the stator of said transmitting Selsyn to the stator of said indicating Selsyn, a gyro flux gate compass, means to amplify the electrical output of said gyro flux gate compass, and means causing said amplifying output to change the electrical field of said motor Selsyn stator.

4. In a navigational aid device of the type having at least two radio receivers, each utilizing a rotatable loop antenna, a transmitting Selsyn having a rotor and a stator, means for causing said transmitting Selsyn rotor to duplicate the angular position of one of said rotatable loop antennas, a motor Selsyn having a rotor and a stator, means for causing said transmitting Selsyn stator to duplicate the angular position of said motor Selsyn rotor, an indicating Selsyn having a stator and a rotor, means for electrically connecting the stator of said transmitting Selsyn to the stator of said indicating Selsyn, a gyro flux gate compass, and means for changing the electrical field of said motor Selsyn stator in accordance with the electrical output of said gyro flux gate compass.

5. In a navigational aid device of the type having at least two radio receivers, each utilizing a rotatable loop antenna, a transmitting Selsyn having a rotor and a stator, means for causing said transmitting Selsyn rotor to duplicate the angular position of one of said rotatable loop antennas, a motor Selsyn having a rotor and a stator, means for causing said transmitting Selsyn stator to duplicate the angular position of said motor Selsyn rotors and indicating Selsyn having a stator and a rotor, means for electrically connecting the stator of said transmitting Selsyn to the stator of said indicating Selsyn, a gyro flux gate compass, and means for changing the electrical field of said motor Selsyn stator in accordance with the azimuth indication of said gyro flux gate compass.

6. In a navigational aid device of the type having at least two radio receivers each utilizing a rotatable loop antenna; a transmitting Selsyn having a rotor and a stator, means for associating said transmitting Selsyn rotor with one of said loop antennas so that the angular rotation of said loop antenna is duplicated by said transmitting Selsyn rotor, a motor Selsyn having a rotor and a stator, means for associating the stator of said transmitting Selsyn with the rotor of said motor Selsyn so that the angular rotation of said motor Selsyn rotor will be duplicated by the stator of said transmitting Selsyn, an indicating Selsyn having a stator and a rotor, means electrically connecting the stator of said transmitting Selsyn to the stator of said indicating Selsyn, an azimuth indicating device and means to modify the stator field of said motor Selsyn in accordance with the indications of said azimuth indicating device.

7. In a navigational system having a plurality of radio receivers each utilizing a separate rotatable loop antenna; a transmitting Selsyn, a motor Selsyn, an indicating Selsyn, each of said Selsyns having a rotor and a stator, means for causing the rotor of said transmitting Selsyn to assume the same angular position as one of said loop antennas, means for causing the stator of said transmitting Selsyn to assume the same angular position as said motor Selsyn rotor, means for electrically connecting said transmitting Selsyn stator to the stator of said indicating Selsyn, an azimuth indicating device, and means for changing the electrical field of said motor Selsyn stator in accordance with the indication of said azimuth indicating device.

8. In a navigational system having two radio receivers each equipped with a rotatable loop antenna; a transmitting Selsyn and a motor Selsyn for each radio receiver, each of said Selsyns having a stator and a rotor, means for connecting each of said loop antennas to the rotor of each of said transmitting Selsyns so that said rotors duplicate the angular positions of each of said loop antennas respectively, means for connecting the stator of each of said transmitting Selsyns to the rotor of each of said motor Selsyns so that the angular position of said transmitting Selsyn rotor is duplicated by its respective transmitting Selsyn stator, means for applying a variable voltage from an azimuth indicating device to the stator of each of said motor Selsyns, a pair of indicating Selsyns each having a stator and a rotor, means for electrically connecting the stator of each of said transmitting Selsyns to the stator of each of said indicating Selsyns.

9. In a craft navigational device of the type having at least two radio receivers for receiving radio energy from at least two radio transmitters simultaneously, each receiver utilizing a rotatable loop antenna; a transmitting Selsyn having a rotor and a stator for each of said loop antennas, means for associating each of said loop antennas with its respective transmitting Selsyn rotor so that the angular position of each loop antenna is duplicated by its respective transmitting Selsyn rotor, a motor Selsyn having a rotor and a stator for each transmitting Selsyn, means for associating the stator of each of said transmitting Selsyns with the rotor of each of said motor Selsyns so that the angular rotation of each motor Selsyn rotor will be duplicated by the stator of its respective transmitting Selsyn, an indicating Selsyn having a rotor and a stator for each of said transmitting Selsyns, a connection between the stator of each transmitting Selsyn to the stator of its respective indicating Selsyn, an azimuth determining means to determine the heading of the craft relative to north, means including said azimuth determining means to modify the field of each of said motor Selsyn stators in accordance with the azimuth determination, said indicating Selsyns having projection means whereby the true azimuth relationship between the craft and each radio transmitter and the fix of the craft is continuously displayed.

LLEWELLYN GOODE DUGGAR.

REFERENCES CITED

The following references are of record in the file of this patent:

UNITED STATES PATENTS

| Number | Name | Date |
| --- | --- | --- |
| 2,235,177 | Stark | Mar. 18, 1941 |
| 2,299,083 | Elm | Oct. 20, 1942 |
| 2,307,029 | Elm | Jan. 5, 1943 |
| 2,361,956 | Moseley | Nov. 7, 1944 |
| 2,364,731 | Luck | Dec. 12, 1944 |
| 2,419,970 | Roe et al. | May 6, 1947 |